United States Patent
Song et al.

(10) Patent No.: US 6,510,030 B1
(45) Date of Patent: Jan. 21, 2003

(54) TRANSDUCING HEAD AND METHOD FOR FORMING A RECESSED SHIELD FOR A TRANSDUCING HEAD

(75) Inventors: Dian Song, Eden Prairie, MN (US); Nurul Amin, Burnsville, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/528,286

(22) Filed: Mar. 17, 2000

Related U.S. Application Data

(60) Provisional application No. 60/149,511, filed on Aug. 17, 1999.

(51) Int. Cl.[7] ............................................. G11B 5/127
(52) U.S. Cl. ..................................... 360/319; 29/603.01
(58) Field of Search ....................... 360/319; 29/603.14, 29/603.15, 603.16, 603.01, 603.07

(56) References Cited

U.S. PATENT DOCUMENTS

| | | | |
|---|---|---|---|
| 5,531,016 A | 7/1996 | Postma et al. ........... 29/603.16 |
| 5,729,410 A | 3/1998 | Fontana, Jr. et al. ........ 360/113 |
| 5,764,453 A | 6/1998 | Postma et al. ............. 360/126 |
| 5,867,889 A | 2/1999 | Dovek et al. ............. 29/603.13 |
| 5,898,548 A | 4/1999 | Dill et al. .................... 360/113 |
| 5,909,344 A | 6/1999 | Gill ............................. 360/113 |
| 5,930,087 A | 7/1999 | Brug et al. .................. 360/113 |
| 5,933,298 A | 8/1999 | Postma et al. .............. 360/113 |
| 5,936,293 A | 8/1999 | Parkin ......................... 257/422 |
| 5,943,187 A | * | 8/1999 | Chen et al. ................. 360/135 |
| 6,055,138 A | * | 4/2000 | Shi ............................. 360/126 |

\* cited by examiner

*Primary Examiner*—David Davis
(74) *Attorney, Agent, or Firm*—Kinney & Lange, P.A.

(57) ABSTRACT

A method for forming a transducing head first requires the deposition of a bottom shield, a bottom thick gap, a bottom thin gap, a sensor, a first flux guide, a top thin gap, a top thick gap, and a top shield. After each of the layers is deposited, an air bearing portion of both the top and bottom thick gaps is removed, such that a length of the air bearing portion of the top thick gap is substantially equal to a length of the air bearing portion of the bottom thick gap. Next, an air bearing shield is deposited over the air bearing surface, the air bearing shield being in contact with the top and bottom shields, the top and bottom thick gaps, the top and bottom thin gaps, and the flux guide. Finally, the air bearing surface of the transducing head is planarized, resulting in the top and bottom thin gaps and the first flux guide each being exposed at the air bearing surface.

6 Claims, 3 Drawing Sheets

TRANSDUCING HEAD AND METHOD FOR FORMING A RECESSED SHIELD FOR A TRANSDUCING HEAD

CROSS-REFERENCE TO RELATED APPLICATION(S)

This Application claims priority from provisional application No. 60/149,511, filed Aug. 17, 1999 for "Air Bearing Shield" of Dian Song and Nural Amin.

BACKGROUND OF THE INVENTION

The present invention relates generally to the field of magnetic data storage and retrieval. In particular, the present invention relates to a magnetic recording head having recessed top and bottom shields.

In a magnetic data storage and retrieval system, a magnetic recording head typically includes a reader portion having a magnetoresistive (MR) sensor for retrieving magnetically-encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

MR sensors fall generally into two broad categories: (1) anisotropic magnetoresistive (AMR) sensors and (2) giant magnetoresistive (GMR) sensors. AMR sensors generally having a single MR layer formed of a ferromagnetic material. The resistance of the MR layer varies as a function of $\cos^2\alpha$, where $\alpha$ is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers.

GMR sensors using two layers of ferromagnetic material separated by a layer of nonmagnetic electrically-conductive material are generally referred to as spin valve (SV) sensors. The layers within a SV sensor include a nonmagnetic spacer layer positioned between a ferromagnetic pinned layer and a ferromagnetic free layer. A magnetization of the pinned layer is fixed in a predetermined direction, typically normal to an air bearing surface of the SV sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

GMR sensors using two layers of ferromagnetic material separated by a layer of nonmagnetic electrically-insulating material are generally referred to as spin-dependent tunnel junction (STJ) sensors. The layers within a STJ sensor include an ultra-thin tunnel barrier layer positioned between a ferromagnetic pinned layer and a ferromagnetic free layer. As in the SV sensor, a magnetization of the pinned layer is fixed in a predetermined direction, typically normal to an air bearing surface of the STJ sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

Shields are generally placed on either side of the MR sensor to ensure that the MR sensor reads only that information which is stored directly beneath it on a magnetic medium or disc. To allow for a greater amount of magnetic flux to be sensed by the MR sensor, the MR sensor is typically positioned such that one surface of the MR sensor is exposed at an air bearing surface (ABS) of the magnetic recording head.

There are several problems associated with this placement of the MR sensor at the ABS. First, the exposed surface of the MR sensor may corrode, leading to sensor failure.

Second, the MR sensor may collide with the magnetic media due to low fly heights, magnetic media asperities or a warp in the surface of the magnetic media. Such collisions can cause the temperature of the MR sensor to increase, thereby affecting the resistance of the MR sensor and causing sensor failure.

Third, the MR sensor may be damaged during the processing of the magnetic recording head, particularly during the lapping of its ABS surface due to the MR sensor also being lapped. One problem associated with the lapping of the MR sensor is that it is important to control the stripe height of the MR sensor to a tolerance greater than allowed by the lapping process. A second problem associated with the lapping of the MR sensor is specific to STJ sensors which should not be lapped due to the very thin barrier layer, the lapping of which will likely result in a short between the two ferromagnetic layers.

The fourth problem associated with the placement of the MR sensor at the ABS is specific to STJ sensors. The resistance of an STJ sensor is inversely related to the area of the sensor (the sensor length multiplied by the sensor width). As STJ sensor widths continue to decrease to achieve the necessary higher recording densities, the sensor length must increase to maintain a constant resistance of the sensor. However, it is difficult to increase the effective length of an STJ sensor placed at the ABS (the effective length being the length of the sensor actually affected by the magnetic flux from the disc). Accordingly, as the width of STJ sensors continues to decrease, the resistance of the sensor will continue to increase, thus requiring the invention of new electronics to convert the read signal of the higher impedance sensor.

To overcome the above-recited problems, magnetic recording heads having a recessed MR sensor have been pursued as alternatives to magnetic recording heads having the MR sensor positioned at the ABS. However, the amount of magnetic flux sensed by the MR sensor diminishes as the MR sensor is moved from the ABS. To increase the amount of flux that reaches the MR sensor, a first flux guide, which extends from the ABS toward the MR sensor, may be used to carry magnetic flux from the ABS to the M sensor. To increase the effective stripe height of the MR sensor, a second flux guide extending from the MR sensor away from the ABS may be added to the recording head to carry flux toward a back edge of the MR sensor. Rather than having two separate flux guides, a single flux guide extending from the ABS toward the back of the MR sensor may replace both the first and second flux guides.

Although the first and second flux guides increase the amount of magnetic flux that reaches the MR sensor, a substantial amount of magnetic flux is still leaked into the top and bottom shields because of the close proximity of the shields to the flux guides and the MR sensor. For the shields to be effective, the gap at the ABS between the top and bottom shields is limited by the bit density of the magnetic media to ensure that the MR sensor receive magnetic flux from only a single transition on the media. The gap between the MR sensor and the top and bottom shields is similarly limited. Because of this smaller gap between the MR sensor and the top and bottom shields, magnetic flux is likely to exit the flux guide and enter the top or bottom shield.

To decrease the amount of magnetic flux leaked into the top and bottom shields, magnetic recording head designers have begun incorporating recessed shields with recessed MR sensors. Recessed shields are shields which have been shaped to have a small read gap between themselves at the ABS and to have a large cavity between themselves away from the ABS. The MR sensor is placed in the cavity.

These recessed shields generally have a non-recessed portion adjacent the ABS and a recessed portion opposite the ABS. The narrow read gap is defined between the non-recessed portions of the top and bottom shields, while the large cavity in which the MR sensor is placed is defined between the recessed portions of the top and bottom shields. In this recessed shield design, there is a larger gap between the MR sensor and the top and bottom shields, thereby minimizing the amount of flux that will escape to the shields.

For recessed shields to be advantageous over non-recessed shields, the length of the non-recessed portion needs to be large enough that the shield can absorb the stray magnetic flux from adjacent transitions on the magnetic media to prevent the MR sensor from reading the stray data. Additionally, the non-recessed portion length needs to be small enough that the amount of magnetic flux exiting the first flux guide and entering the top and bottom shields is minimized. If the non-recessed portion length is too large, much of the magnetic flux will have leaked into the top and bottom shields before it reaches the recessed portion of the shields, thereby eliminating any advantage gained by the use of recessed shields.

The effective non-recessed portion length of a magnetic recording head having top and bottom recessed shields is the larger of the non-recessed portion lengths of the top and bottom shields. Because it is generally desired that the non-recessed portion length be as short as possible, it is important that the non-recessed portion lengths of the top and bottom shields be substantially equal to one another.

Recessed shields typically are shaped by photolithography. This process, however, is limited in the amount of control over tolerance that can be exerted. Therefore, there is a need for a recessed shield design that allows for greater control of the non-recessed portion lengths of both the top and bottom shields to ensure their substantial equality.

BRIEF SUMMARY OF THE INVENTION

A method for forming a transducing head first requires the deposition of a bottom shield, a bottom thick gap, a bottom thin gap, a sensor, a first flux guide, a top thin gap, a top thick gap, and a top shield. After each of the layers is deposited, an air bearing portion of both the top and bottom thick gaps is removed, such that a length of the air bearing portion of the top thick gap is substantially equal to a length of the air bearing portion of the bottom thick gap. Next, an air bearing shield is deposited over the air bearing surface, the air bearing shield being in contact with the top and bottom shields, the top and bottom thick gaps, the top and bottom thin gaps, and the flux guide. Finally, the air bearing surface of the transducing head is planarized, resulting in the top and bottom thin gaps and the first flux guide each being exposed at the air bearing surface.

DETAILED DESCRIPTION

Figure 1:
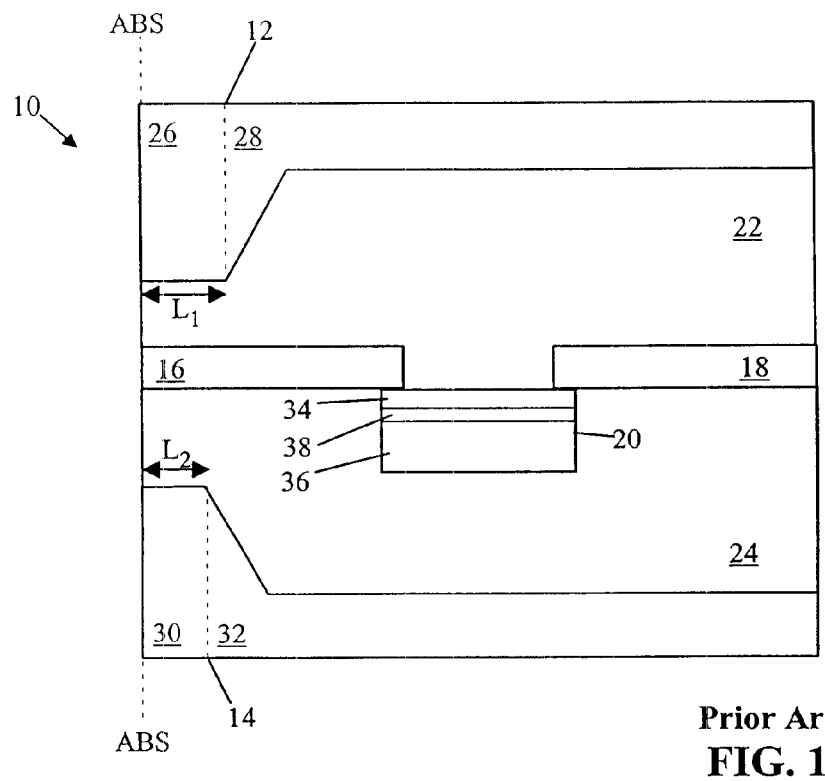
FIG. 1 is a cross-sectional view of a magnetic recording head of the prior art.

FIG. 1 is a cross-sectional view of magnetic recording head 10 of the prior art taken normal to an air bearing surface (ABS) of magnetic recording head 10. Magnetic recording head 10 includes recessed top shield 12, recessed bottom shield 14, first flux guide 16, second flux guide 18, magnetoresistive (MR) sensor 20, top gap 22 and bottom gap 24. Recessed top shield 12, which includes non-recessed portion 26 and recessed portion 28, and recessed bottom shield 14, which similarly includes non-recessed portion 30 and recessed portion 32, are each shaped to create a large cavity between recessed portion 28 of top shield 12 and recessed portion 32 of bottom shield 14.

Non-recessed portion 26 of top shield 12 has one edge at the ABS of recording head 10, and an opposite edge adjacent recessed portion 28 of top shield 12. Similarly, non-recessed portion 30 of bottom shield 14 has one edge at the ABS of recording head 10, and an opposite edge adjacent recessed portion 32 of bottom shield 14.

MR sensor 20 is positioned away from the ABS of recording head 10 in the cavity formed between recessed portion 28 of top shield 12 and recessed portion 32 of bottom shield 14. First flux guide 16 is positioned between top shield 12 and bottom shield 14, extending from the ABS of recording head 10 to MR sensor 20. Second flux guide 18 is positioned between top shield 12 and bottom shield 14, extending from MR sensor 20 away from the ABS of recording head 10. First and second flux guides 16 and 18 may be replaced with a single flux guide positioned between top shield 12 and bottom shield 14, the single flux guide extending from the ABS past a back edge of MR sensor 20. Top gap 22 separates top shield 12 from first flux guide 16, second flux guide 18 and MR sensor 20. Similarly, bottom gap 24 separates bottom shield 14 from first flux guide 16, second flux guide 18 and MR sensor 20.

MR sensor 20 maybe any type of magnetoresistive sensor, including an anisotropic magnetoresistive (AMR) sensor, a spin valve (SV) sensor, or a spin-dependent tunnel junction (STJ) sensor. As shown in FIG. 1, MR sensor 20 is an STJ sensor having free layer 34, pinned layer 36 and barrier layer 38 positioned between free layer 34 and pinned layer 36. Free layer 34 and pinned layer 36 are each preferably formed of ferromagnetic materials, while barrier layer 38 is preferably formed of a nonmagnetic electrically-insulating material. A magnetization of pinned layer 36 is fixed in a predetermined direction, typically normal to the ABS, while a magnetization of free layer 34 rotates freely in response to an external magnetic field. A layer of antiferromagnetic material (not shown in FIG. 1) is typically exchange coupled to pinned layer 36 to fix the magnetization of pinned layer 36 in the predetermined direction, although other means of fixing the magnetization of pinned layer 36 are available.

Non-recessed portion 26 of top shield 12 has a non-recessed portion length $L_1$, and non-recessed portion 30 of bottom shield 14 has a non-recessed portion length $L_2$. Preferably, non-recessed portion length $L_1$ substantially equals non-recessed portion length $L_2$; however, recessed shields are typically shaped by photolithography, which is limited in the amount of control that can be exerted over tolerance between non-recessed portion lengths $L_1$ and $L_2$.

FIGS. 2A–2F are cross-sectional views illustrating the prior art method of forming magnetic recording head 10. For ease of illustration, the views shown in FIGS. 2A–2F are limited to an air bearing region of magnetic recording head 10 near an air bearing surface (ABS) of recording head 10. Those skilled in the art will recognize that additional layers may be included in magnetic recording head 10, and that additional processing steps may be necessary between the deposition of some or all of the below-recited layers to achieve the desired shapes and/or properties of those layers.

Figure 2A:
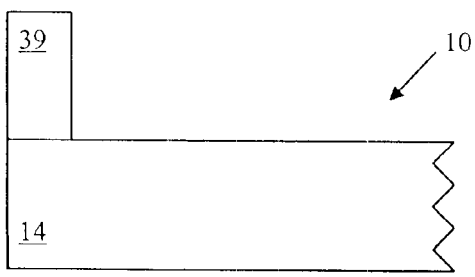
FIGS. 2A–2F are cross-sectional views illustrating the prior art method of forming a magnetic recording head have recessed shields.

As shown in FIG. 2A, planar, non-recessed bottom shield 14 is deposited on a substrate (not shown in FIG. 2A). Next, first mask 39 is deposited on a portion of bottom shield 14, the portion covered being the desired non-recessed portion 30 of bottom shield 14.

Figure 2B:

FIG. 2B shows bottom shield 14 after it has been ion milled to form a recess and first mask 39 has been removed. Bottom shield 14 has non-recessed portion 30, which was positioned beneath first mask 39, and recessed portion 32. Non-recessed portion 30 has non-recessed portion length $L_2$ that was determined by the photolithographic deposition of first mask 39 and the ion milling of bottom shield 14.

Figure 2C:
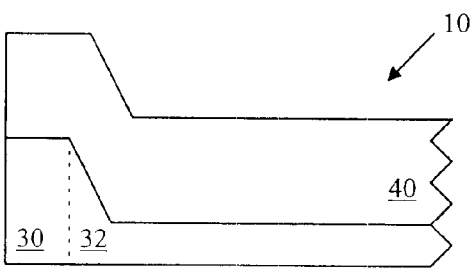

FIG. 2C shows recording head 10 after bottom thick gap 40 has been deposited. It is preferred that bottom thick gap 40, as first deposited, have a thickness greater than the thickness of the recess in bottom shield 14. Next, a top surface of recording head 10 is planarized, as shown in FIG. 2D, to expose a top surface of non-recessed portion 30 of bottom shield 14.

Figure 2D:
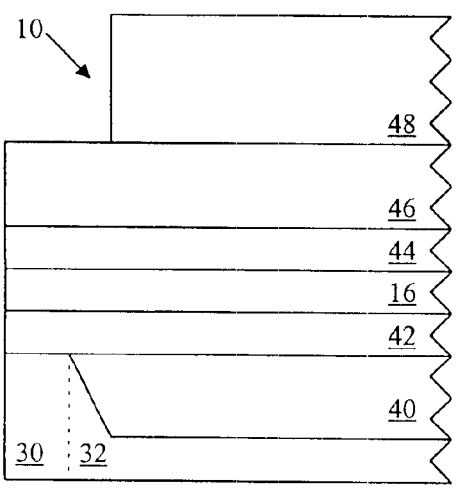

Once recording head 10 is planarized, bottom thin gap 42, first flux guide 16, top thin gap 44, top thick gap 46, and second mask 48 are sequentially deposited over the planarized surface of recording head 10, as shown in FIG. 2D. Bottom thick gap 40 and bottom thin gap 42 together form bottom gap 24, while top thin gap 44 and top thick gap 46 together form top gap 22. It is contemplated that additional layers may be included within magnetic recording head 10, including, but not limited to, the layers which form MR sensor 20 (not shown in FIGS. 2A–2F). Additionally, as those skilled in the art will recognize, additional processing steps may be necessary between the deposit of some or all of the above-recited layers to achieve the desired shapes and/or properties of those layers.

Second mask 48 is positioned away from the ABS to allow for the selective removal of an air bearing portion of top thick gap 46. The air bearing portion is preferably removed through use of a reactive ion etch (RIE) process. The materials used to form top thin gap 44 and top thick gap 46 are preferably selected to ensure a high selectivity of the RIE between top thick gap 46 and top thin gap 44.

Figure 2E:
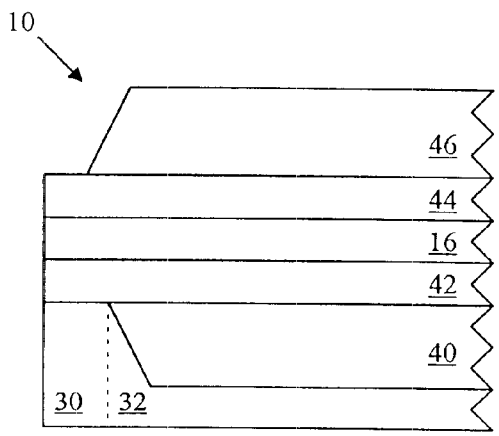
Figure 2F:
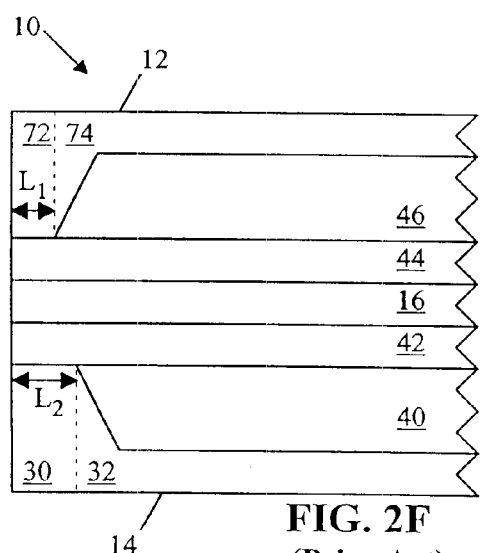

FIG. 2E shows magnetic recording head 10 after top thick gap 46 has been shaped through use of the RIE and after second mask 48 has been removed. Finally, as shown in FIG. 2F, top shield 12 is deposited over an air bearing portion of top thin gap 44 and over top thick gap 46. Top shield 12 has non-recessed portion 72 and recessed portion 74. Non-recessed portion has non-recessed portion length $L_1$ that was determined by the photolithographic deposition of second mask 48 and the RIE of top thick gap 46.

FIGS. 2A–2F illustrate the difficulty in equalizing non-recessed portion length $L_1$ and non-recessed portion length $L_2$, which are preferably within 0.1 microns of each other. Both non-recessed portion length $L_1$ and non-recessed portion length $L_2$ are determined by photolithography, which is limited in the amount of control that can be exerted over tolerance between non-recessed portion lengths $L_1$ and $L_2$. Accordingly, prior art recording head 10 is limited in application.

Figure 3:
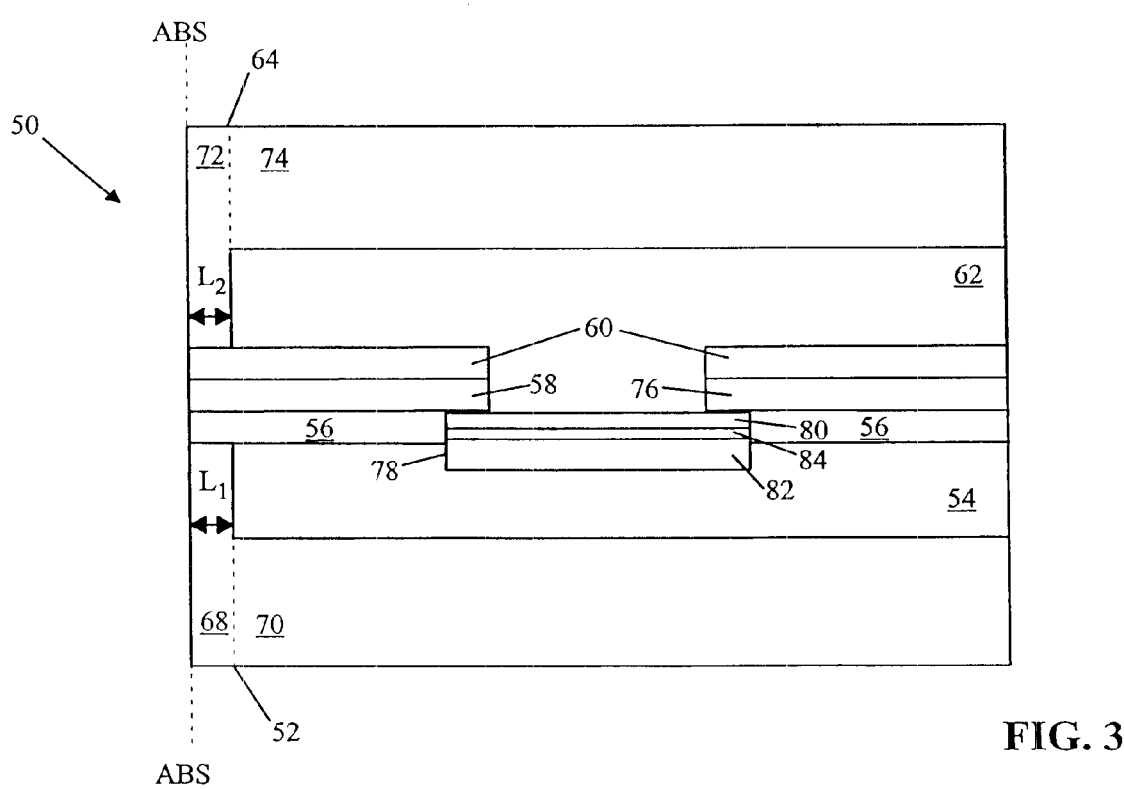
FIG. 3 is a cross-sectional view of a magnetic recording head in accord with the present invention.

FIG. 3 is a cross-sectional view of magnetic recording head 50 in accord with the present invention. The cross-section is taken normal to an air bearing surface (ABS) of magnetic recording head 50. Magnetic recording head 50 includes recessed bottom shield 52, bottom thick gap 54, bottom thin gap 56, first flux guide 58, top thin gap 60, top thick gap 62, recessed top shield 64, second flux guide 76, and magnetoresistive (MR) sensor 78.

MR sensor 78 is positioned away from the ABS of recording head 50 (e.g., MR sensor 78 is recessed from the ABS). MR sensor 78 is used to retrieve magnetically-encoded information stored on a magnetic disc (not shown in FIG. 3). Magnetic flux emanating from the disc affects the resistivity of MR sensor 78, the change of which can be detected by passing a current through MR sensor 78 and measuring a voltage across MR sensor 78.

MR sensor 78 may be any type of magnetoresistive sensor, such as an anisotropic magnetoresistive (AMR) sensor, a giant magnetoresistive (GMR) sensor, or a spin-dependent tunnel junction (STJ) sensor. Of the types of MR sensors, the recessed shield design of the present invention is particularly beneficial for use in conjunction with STJ sensors, which are not easily placed at the ABS of recording head 50.

As shown in FIG. 3, MR sensor 78 of magnetic recording head 50 is an STJ sensor having free layer 80, pinned layer 82, and barrier layer 84 positioned between free layer 80 and pinned layer 82. Free layer 80 and pinned layer 82 are each preferably formed of ferromagnetic materials, while barrier layer 84 is preferably formed of a nonmagnetic electrically-insulating material. A magnetization of pinned layer 82 is fixed in a predetermined direction, typically normal to the ABS, while a magnetization of free layer 80 rotates freely in response to an external magnetic field. A layer of antiferromagnetic material (not shown in FIG. 3) is typically exchange coupled to pinned layer 82 to fix the magnetization of pinned layer 82 in the predetermined direction, although other means of fixing the magnetization of pinned layer 82 are available.

In a preferred embodiment of STJ sensor 78, free layer 80 has a thickness in the range of about 25 Å to about 100 Å, pinned layer 82 has a thickness in the range of about 100 Å to about 300 Å, and barrier layer 84 has a thickness of about 10 Å. The thinness of barrier layer 84 prevents the conventional placement of STJ sensor 78 at the ABS of magnetic recording head 50 for high bit density recording. A sensor placed at the ABS must be lapped during processing. The lapping of STJ sensor 78, however, will very likely cause a short between free layer 80 and pinned layer 82, due to the thinness of barrier layer 84.

Bottom shield 52 has non-recessed portion 68 and recessed portion 70. Non-recessed portion 68 of bottom shield 52 has one edge at the ABS of recording head 50, and an opposite edge adjacent recessed portion 70 of bottom shield 52. Similarly, top shield 64 has non-recessed portion 72 and recessed portion 74. Non-recessed portion 72 of top shield 64 has one edge at the ABS of recording head 50, and an opposite edge adjacent recessed portion 74 of top shield 64. A cavity is created between recessed portion 70 of bottom shield 52 and recessed portion 74 of top shield 64. A read gap is created between non-recessed portion 68 of bottom shield 52 and non-recessed portion 72 of top shield 64.

MR sensor 78 is positioned between bottom shield 52 and top shield 64; more specifically, MR sensor 78 is placed within the cavity formed between recessed portion 70 of bottom shield 52 and recessed portion 74 of top shield 64. Bottom shield 52 and top shield 64 serve to ensure that MR sensor 78 senses only magnetic flux stored directly beneath it on the magnetic disc. The recessed design of bottom shield 52 and top shield 64 allow for MR sensor 78 to be recessed from the ABS, thereby preventing the lapping of MR sensor 78.

Non-recessed portion 68 of bottom shield 52 has non-recessed portion length $L_1$, and non-recessed portion 72 of top shield 64 has non-recessed portion length $L_2$. In a preferred embodiment of magnetic recording head 50, non-recessed portion length $L_1$ substantially equals non-recessed portion length $L_2$. Preferably, recessed lengths $L_1$ and $L_2$ are each in the range of about 0.1 microns to about 0.5 microns.

First flux guide 58 is positioned between bottom shield 52 and top shield 64, extending from the ABS of recording head 50 toward MR sensor 78. Second flux guide 76 is positioned between bottom shield 52 and top shield 64, extending from near MR sensor 78 and away from the ABS of recording head 50. First flux guide 58 serves to carry magnetic flux from the ABS of recording head 50 to MR sensor 78, while second flux guide 76 serves to carry magnetic flux toward a back edge of MR sensor 78. In a preferred embodiment, first and second flux guides 58 and 76 each have a thickness in the range of about 100 Å to about 200 Å. First and second flux guides 58 and 76 may be replaced with a single flux guide positioned between top shield 64 and bottom shield 52, the single flux guide extending from the ABS past a back edge of MR sensor 78.

Positioned on either side of first and second flux guides 58 and 76 are bottom and top thin gaps 56 and 60, each of which is exposed at the ABS of magnetic recording head 50. Bottom and top thin gaps 56 and 60 each preferably have a thickness in the range of about 50 Å to about 500 Å, and most preferably, of about 250 Å.

Bottom thick gap 54 is positioned adjacent bottom shield 52 and top thick gap 62 is positioned adjacent top shield 64 such that bottom thin gap 56, first flux guide 58, top thin gap 60, second flux guide 76, and MR sensor 78 are each positioned between bottom thick gap 54 and top thick gap 62. Bottom and top thick gaps 54 and 62 each preferably have a thickness in the range of about 2000 Å to about 1 micron, and most preferably, of about 5000 Å.

Preferably, bottom thick gap 54 and top thick gap 62 are each formed of $Si_3N_4$, while bottom thin gap 56 and top thin gap 60 are each formed of $Al_2O_3$. This combination of using $Si_3N_4$ for thick gaps 54 and 62 and $Al_2O_3$ for thin gaps 56 and 60 should provide sufficient selectivity of the reactive ion etch (RIE) to allow thick gaps 54 and 62 to be cleanly etched while leaving thin gaps 56 and 60 untouched, as shown in FIG. 4B. Alternatively, either thin gaps 56 and 60 or thick gaps 54 and 62 may be formed of a non-magnetic metal, such as copper, to improve the selectivity of the RIE between thick gaps 54 and 62 and thin gaps 56 and 60. Thus, if thin gaps 56 and 60 provide sufficient isolation, thick gaps 54 and 62 may be formed of a non-magnetic metal, thereby providing better thermal grounding to MR sensor 78. On the other hand, thin gaps 56 and 60 may be formed of a non-magnetic metal, while thick gaps 54 and 62 are formed of $Si_3N_4$. Those skilled in the art of magnetic recording head design will recognize that thin gaps 56 and 60 and thick gaps 54 and 62 maybe formed of materials other than $Si_3N_4$ and $Al_2O_3$ to achieve similar properties. Finally, bottom and top shields 52 and 64 may be used as electrical contacts for MR sensor 78. In this situation, it is not necessary to electrically isolate MR sensor 78 from bottom and top shields 52 and 64, thus allowing for thin gaps 56 and 60 and thick gaps 54 and 62 to be formed of any non-magnetic material, either metallic or non-metallic, provided that proper RIE recipes can be found with sufficient etching selectivity.

FIGS. 4A–4D are cross-sectional views illustrating the inventive process of forming magnetic recording head 50. For ease of illustration, the views shown in FIGS. 4A–4D are limited to an air bearing region of magnetic recording head 50 near an air bearing surface (ABS) of recording head 50.

Figure 4A:
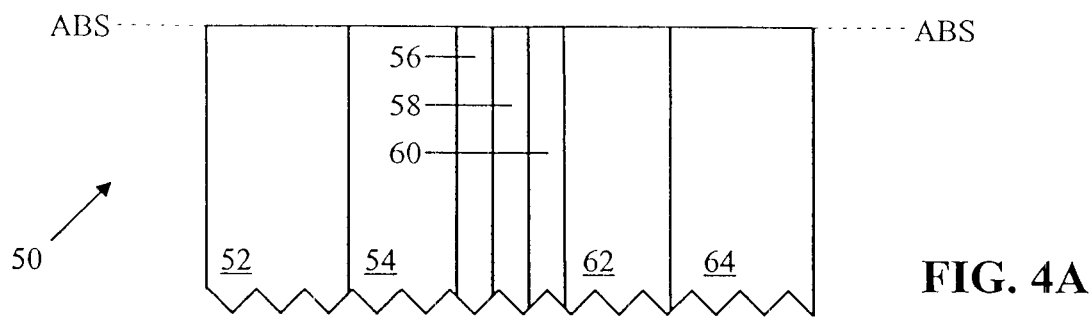
FIGS. 4A–4D are cross-sectional views illustrating the process of forming a magnetic recording head in accord with the present invention.
Figure 4B:
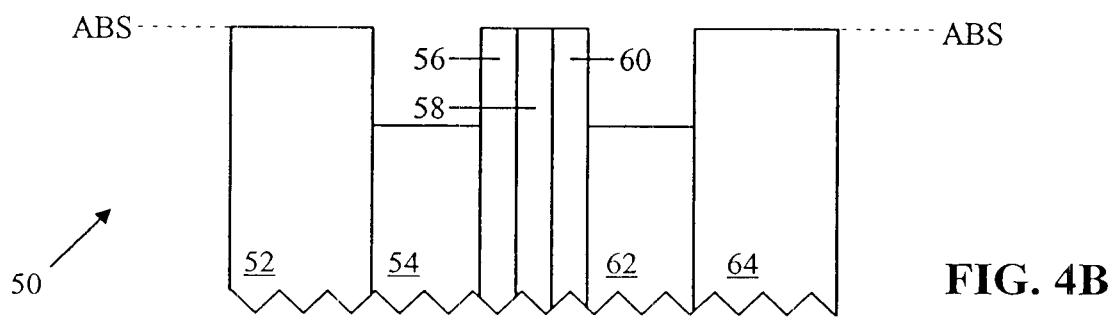

First, as shown in FIG. 4A, each of the following layers are deposited, in the order listed: bottom shield 52, bottom thick gap 54, bottom thin gap 56, first flux guide 58, top thin gap 60, top thick gap 62, and top shield 64. It is contemplated that additional layers may be included within magnetic recording head 50, including, but not limited to, the layers which form MR sensor 78 (not shown in FIG. 4A). Additionally, as those skilled in the art will recognize, additional processing steps may be necessary between the deposit of some or all of the above-recited layers to achieve the desired shapes and/or properties of those layers.

Second, as shown in FIG. 4B, air bearing portions of both bottom thick gap 54 and top thick gap 62 are removed. To ensure that the final non-recessed portion lengths $L_1$ and $L_2$ of respective bottom and top shields 52 and 64 are substantially equal, the air bearing portions of both bottom thick gap 54 and top thick gap 62 should have substantially equal lengths, wherein those lengths are measured normal to the ABS. The air bearing portions of both bottom thick gap 54 and top thick gap 62 may be selectively removed through use of a reactive ion etch (RIE). As described above in reference to FIG. 3, the materials used to form thick gaps 54 and 62 and thin gaps 56 and 60 should be selected to ensure a high selectivity of the RIE between the thick and thin gaps. This RIE process typically offers alignment of non-recessed portion lengths $L_1$ and $L_2$ within 10 Å, thereby allowing for improvement over the prior art by a factor of 100.

Figure 4C:
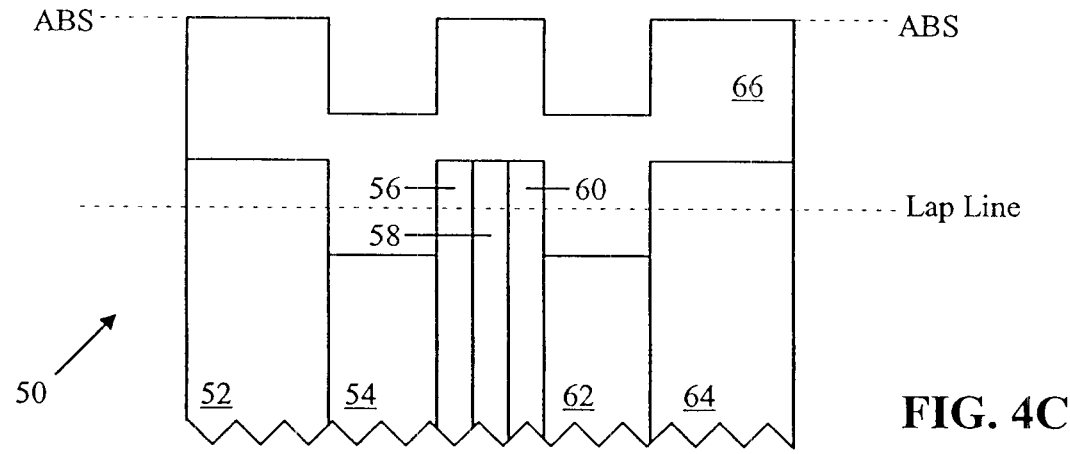

Third, as shown in FIG. 4C, air bearing shield 66 is deposited over the ABS of magnetic recording head 50, directly contacting bottom shield 52, bottom thick gap 54, bottom thin gap 56, first flux guide 58, top thin gap 60, top thick gap 62, and top shield 64. Air bearing shield 66 is preferably formed by a material similar to the material forming bottom shield 52 and top shield 64.

Figure 4D:
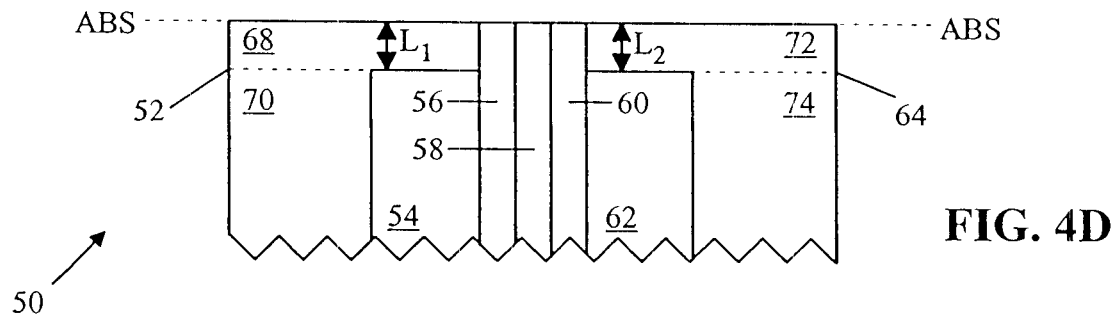

Finally, as shown in FIG. 4D, the ABS of magnetic recording head 50 is planarized to achieve a desired height of recording head 50. It is important that the bottom thin gap 56, first flux guide 58 and top thin gap 60 each be exposed at the ABS after the planarization step is complete. To ensure that those layer are exposed, the resistance between bottom shield 52 and top shield 64 may be monitored. Before planarization, bottom shield 52 is shorted to top shield 64 by air bearing shield 66, and after planarization, an open circuit should exist between bottom shield 52 and top shield 64. The planarization of recording head 50 may be implemented through several processes, including lapping the ABS or ion milling the ABS at a grazing angle.

Once completed, air bearing shield 66 combines with bottom shield 52 to make bottom shield 52 a recessed shield having non-recessed portion 68 and recessed portion 70. Similarly, air bearing shield 66 combines with top shield 64 to make top shield 64 a recessed shield having non-recessed portion 72 and recessed portion 74.

The above-described method, which combines reactive ion etching and planarization to form recessed shields 52 and 64, allows for much greater control over non-recessed portion recessed lengths $L_1$ and $L_2$ of respective bottom and top shields 52 and 64 than previous techniques such as photolithography.

Although the present invention has been described with reference to preferred embodiments, workers skilled in the art will recognize that changes may be made in form and detail without departing from the spirit and scope of the invention.

What is claimed is:

1. A method for forming a transducing head having an air bearing surface, the method comprising:

sequentially depositing a bottom shield, a bottom thick gap, a bottom thin gap, a first flux guide, a top thin gap, a top thick gap and a top shield; and subsequently transforming the top and bottom shields into recessed shields each having a recessed portion and a non-recessed portion, a thickness of the non-recessed portion being greater than a thickness of the recessed portion.

2. The method of claim 1 wherein a length of the non-recessed portion of the top shield substantially equals a length of the non-recessed portion of the bottom shield.

3. The method of claim 2 wherein the top and bottom thick gaps are each formed of $Si_3N_4$ and the top and bottom thin gaps are each formed of $Al_2O_3$.

4. The method of claim 1 wherein the step of transforming the top and bottom shields comprises:

removing an air bearing portion of both the top and bottom thick gaps, wherein a length of the air bearing portion of the top thick gap is substantially equal to a length of the air bearing portion of the bottom thick gap;

depositing an air bearing shield on the air bearing surface of the transducing head, the air bearing shield being in contact with the top and bottom shields, the top and bottom thick gaps, the top and bottom thin gaps, and the flux guide; and planarizing the air bearing surface of the transducing head, such that the top and bottom thin gaps and the first flux guide are each exposed at the air bearing surface of the transducing head.

5. The method of claim 4 wherein the step of removing an air bearing portion of both the top and bottom thick gaps is performed using a reactive ion etch method.

6. The method of claim 5 wherein a thick gap material for forming the top and bottom thick gaps and a thin gap material for forming the top and bottom thin gaps are each selected to ensure high selectivity of a reactive ion etch of the top and bottom thick gaps.

* * * * *